Patented Mar. 2, 1937

2,072,270

UNITED STATES PATENT OFFICE 2,072,270

METHOD OF MAKING ORGANIC ESTERS OF CELLULOSE

Herbert E. Martin, Cumberland, Md., assignor to Celanese Corporation of America, a corporation of Delaware No Drawing. Application January 13, 1934, Serial No. 706,537

12 Claims. (Cl. 260—101)

This invention relates to the process of preparing organic esters of cellulose and relates more particularly to a method of removing the organic acid employed during the esterification as solvent for the cellulose ester being formed.

An object of the invention is to prepare organic esters of cellulose in an expeditious manner. A further object of my invention is to recover the diluents or solvents employed during the esterification of cellulose by an economical process. Other objects of my invention will appear from the following detailed description.

In the process of preparing organic esters of cellulose the esterification of the cellulose is usually conducted in the presence of a substantial amount of solvent for the ester of cellulose being formed. Thus in preparing cellulose acetate, cellulose is acetylated by treatment with acetic anhydride and a catalyst such as sulphuric acid in the presence of a large amount of glacial acetic acid as a solvent for the cellulose acetate that is formed. After completion of the acetylation the resulting solution of cellulose acetate in glacial acetic acid is treated with a large amount of water which dilutes the acetic acid to such an extent that the cellulose acetate precipitates. After removal of the precipitated cellulose acetate there remains a relatively dilute solution of acetic acid. The recovery of the acetic acid in usable form from this diluted solution is a matter of great difficulty since glacial acetic acid cannot be separated therefrom by ordinary methods of distillation.

I have found that if instead of precipitating the cellulose acetate from solution in the strong acetic acid in which it is formed by the addition of large amounts of water, part of the acetic acid may be recovered by direct distillation and that the remaining part of the acetic acid may be separated from the cellulose acetate by precipitation with an organic liquid and then this solution of the precipitant and acetic acid separated from the cellulose acetate by distillation. The acetic acid may then be recovered from the organic liquid either in the form of glacial acetic acid or in such concentrated form that it may be fractionally distilled to produce glacial acetic acid. This is due to the fact that while relatively dilute aqueous solutions of acetic acid cannot be concentrated by ordinary methods of distillation, concentrated solutions of acetic acid and dilute solutions of acetic acid in certain organic solvents may be readily distilled to form glacial acetic acid.

According to my invention then, I prepare organic esters of cellulose by esterifying cellulose in any suitable form by means of any esterifying agent in the presence of a suitable catalyst and an organic acid as solvent in any suitable manner. After completion of the esterification of the cellulose there results a homogeneous viscous solution, to which a small amount of water may be added to convert any of the organic acid anhydride remaining into the corresponding acid. According to this invention this homogeneous solution is subjected to distillation, either at this stage or after the same, upon addition of a suitable amount of water, has been subjected to a hydrolysis treatment known as ripening, to recover a part of the organic acid employed as diluent or solvent directly from the esterifying mixture. After removal of the first part of this organic acid by direct distillation there is added to the partially dried homogeneous mass, an organic liquid which is not a solvent for the cellulose ester to dilute the remaining organic acid and this diluted acid is then distilled until the cellulose ester is completely dried. The distillate from the second distillation stage may then be fractionally distilled to separate the glacial acetic acid from the organic liquid. The glacial acetic acid recovered in the first step and the second step may then be rectified and used again in succeeding batches of cellulose ester preparation, while the organic liquid may be returned to a partially dried cellulose ester batch as an aid in the recovery of more acetic acid. In place of distilling off a part of the acetic acid prior to adding the organic non-solvent liquid, the organic non-solvent liquid may be employed to precipitate the cellulose ester prior to any distillation. In such a method the distillation after once being started may be carried through to completion without interruption.

This invention may be employed in the making of any suitable organic ester of cellulose such as cellulose acetate, cellulose formate, cellulose propionate, cellulose butyrate. Cellulose in any suitable form, such as cotton, cotton linters, wood pulp, either sulphite or soda pulp, reconstituted cellulose, etc. may be employed in making the cellulose ester. This cellulose may be activated by pre-treatment with lower aliphatic acids such as acetic or formic acids or with a treatment of alkali etc. The esterifying agent may be acetic anhydride, formic acid, propionic anhydride or butyric anhydride, depending upon the ester of cellulose to be formed. The esterification steps of all the esters of cellulose are carried out in a manner similar to that described in reference to cellulose acetate. The esterification may be carried out in the presence of a suitable catalyst such as sulphuric acid, zinc chloride, sodium bisulphate, methyl sulphate, etc. There may be employed as a solvent for the cellulose ester formed, any suitable organic acid, such as acetic acid, propionic acid or butyric acid, depending largely upon the nature of the anhydride employed and the desired cellulose ester.

The cellulose ester may be first hydrolized or ripened by the addition of a suitable quantity of water to the primary solution resulting from the esterifying process to convert any remaining anhydride to the corresponding acid, and permitting the same to stand at suitable temperatures, and for such time until the cellulose ester develops the desired solubility characteristics prior to subjecting the same to the first distillation step to recover the organic acid employed as solvent or diluent. Although it is preferable to first ripen the cellulose esters prior to distillation, my invention is not limited thereto, as the distillation and the complete removal of the organic acid diluents or solvent may take place immediately after esterification, or at any period from then until the complete ripening of the cellulose ester has taken place.

The distillation of the organic acid from the solutions of the cellulose esters may be carried out at any suitable temperature and at any suitable pressures, ranging from super-atmospheric pressure through atmospheric pressure to absolute vacuum. However, we prefer to employ reduced pressures in order to lower the temperature at which the distillation is conducted so as to avoid danger of decomposition. If desired, air or any inert gas such as nitrogen or carbon dioxide may be injected into the mass to assist the distillation. It is also preferable to agitate or stir the mass during distillation, particularly as it approaches dryness.

While all of the organic acid may be distilled completely from the esterifying mixture, a feature of this invention is to interrupt the distillation while some of the acid still remains in the mixture, and preferably in such amounts as to maintain the cellulose esters in solution. Great care must be exercised in unaided direct distillation, as the acetic acid reaches a zero content as the temperatures of the distillation are such as to char and over-ripen certain parts of the batch, destroying the uniformity of the resulting product. According to this invention it is preferable to remove from the esterifying mixture by unaided direct distillation only a restricted quantity of the organic ester, say 50%, whereby a sufficient amount of organic acid remains in the mixture to keep the cellulose esters in solution and prevents any charring or over-ripening The esterifying mixtures may be distilled until only such an amount of organic acid is left behind in the mixture as is equivalent to that amount of anhydride of the acid that is required for the next charge. Thus the distillate of the first distillation may be run almost directly back to a succeeding charge in the form of glacial acetic acid. The solution of acid and cellulose esters remaining from the distillation is then treated with a sufficient quantity of an organic liquid which is not a solvent for the cellulose esters to precipitate the cellulose esters. From this mixture of precipitated cellulose esters, and organic acid diluted with the organic liquid, the liquids are distilled, leaving the dry cellulose esters. This is preferably done while stirring the mixture and also performing the distillation under vacuum to reduce the temperature. By this method it is possible to remove all of the organic acid from the ripened or unripened esterified cellulose solution. The use of a non-solvent liquid which will precipitate the cellulose ester and that will aid to distill off all the organic acid of the esterification mixture, provides a process whereby all the organic acid may be directly distilled from the mixture and a process whereby organic acid may be recovered in very concentrated form by direct distillation. In the formation of cellulose acetate, for example, it is easily possible to remove 50% or more of the recoverable acetic acid by direct distillation under vacuum. It is possible to remove the remaining portion of the acetic acid by precipitating and distilling with an organic liquid that is a non-solvent for the cellulose acetate after the direct distillation has been made.

Any organic liquid that is a non-solvent for cellulose acetate and that has no chemical action thereon, and yet one that is mixable with the organic acid employed in the acetylation may be used. Examples of such liquids are amyl alcohol, amyl acetate, xylene, high boiling petroleum fractions, ethylene glycol, methyl alcohol, benzene, and other non-solvent organic liquids that have properties similar to the above named. For the treatment of cellulose esters to be used in spinning solutions for filaments, films and yarns, it is preferable to use an organic liquid non-solvent having a higher boiling point than the organic acid used in esterification. The use of organic liquid non-solvents having boiling points lower than the organic acid used in the esterification, tends to make a horny, hard cellulose ester, which is not preferable for spinning fine filaments, but that may be used in lacquers and like preparations.

It is preferable, before raising the temperature of the cellulose ester for the purpose of distillation, to neutralize the catalyst used by adding to the solution suitable amounts of suitable neutralizing agents. Example of suitable neutralizing agents are anhydrous sodium acetate, sodium carbonate and sodium bicarbonate. It is especially preferable to neutralize the catalyst before distillation of an esterified cellulose solution that has been permitted to ripen prior to the distillation.

For the purpose of further describing the invention there is given the following examples.

*Example I*

38 lbs. 1 oz. of ripened cellulose acetate acetic acid solution, equivalent to 7.8 lbs. cellulose acetate is placed in a mixer. To this is added 1.25 lbs. of anhydrous sodium acetate, to neutralize the sulfuric acid present that was employed as catalyst. This solution is heated under vacuum until 13 lbs. 14.1 oz. or 49.02% of the total recoverable acetic acid is distilled off and collected.

The cellulose acetate is then precipitated and hardened by the addition of 23 lbs. 9 ozs. of amyl alcohol. This mixture after a short period of standing is then heated under vacuum to distill off the amyl alcohol and acetic acid, recovering 12 lbs. 13.79 ozs. of acetic acid and also the amyl alcohol, part of which is converted to amyl acetate during the distillation. The cellulose acetate at the end of the distillation is a soft dry powder of homogeneous properties. Although the temperature has been raised the cellulose acetate has not further hydrolyzed but retains the same ripened properties such as acetyl content, viscosity characteristics and solvent forming properties that it has at the beginning of the distillation. The acetic acid may be fractionally distilled from the amyl alcohol and amyl acetate solution.

*Example II*

Example I is repeated using amyl acetate in place of amyl alcohol. The amyl acetate may be added in lesser amounts than is required using amyl alcohol as there is no esterification during the distillation. Excessive amounts of the organic non-solvent, however, are not injurious to the process, they merely increase the cost of operation by requiring the additional distillation thereof.

*Example III*

To 108 kilograms of a solution of cellulose acetate in acetic acid are added 200 liters of xylene. The cellulose acetate breaks into small pieces resembling jells with a separation therefrom of part of the acid/xylene mixture which may be decanted from the partially precipitated cellulose acetate. To the remaining mixture is added 100 liters more of xylene and the mixture distilled under vacuum to dryness. The cellulose acetate obtained is a little hard and in the form of little balls. It is not hydrolyzed however during this treatment. The acetic acid may be recovered in concentrated form by fractionally distilling the acid/xylene mixture.

Having described my invention, what I desire to secure by Letters Patent is:

1. The process of preparing cellulose esters comprising esterifying cellulose by means of an esterifying agent in the presence of an organic acid and a catalyst, adding thereto a neutralizing agent for the catalyst and an organic non-solvent liquid and subjecting the resulting mixture to distillation to remove the organic acid and the organic non-solvent liquid from the cellulose ester.

2. The process of preparing cellulose acetate comprising acetylating cellulose by means of acetic anhydride in the presence of acetic acid and a catalyst, adding thereto a neutralizing agent for the catalyst and an organic non-solvent liquid and subjecting the resulting mixture to distillation to remove the acetic acid and the organic non-solvent liquid from the cellulose acetate.

3. The process of preparing cellulose esters comprising esterifying cellulose by means of an esterifying agent in the presence of an organic acid, subjecting the resultant mixture to distillation to remove part of the organic acid, interrupting the distillation, precipitating the cellulose ester with an organic non-solvent liquid and continuing the distillation to remove the remaining organic acid from the cellulose ester.

4. The process of preparing cellulose acetate comprising acetylating cellulose by means of acetic anhydride in the presence of acetic acid, subjecting the resulting mixture to distillation to remove part of the acetic acid, interrupting the distillation, precipitating the cellulose acetate with an organic non-solvent liquid and continuing the distillation to remove the remaining acetic acid and the organic non-solvent liquid from the cellulose acetate.

5. The process of preparing cellulose esters comprising esterifying cellulose by means of an esterifying agent in the presence of an organic acid, subjecting the resulting mixture to distillation to remove part of the organic acid, interrupting the distillation, precipitating the cellulose ester with an organic non-solvent liquid having a higher boiling point than the organic acid and continuing the distillation to remove the remaining organic acid from the cellulose ester.

6. The process of preparing cellulose acetate comprising acetylating cellulose by means of acetic anhydride in the presence of acetic acid, subjecting the resulting mixture to distillation to remove part of the acetic acid, interrupting the distillation, precipitating the cellulose acetate with an organic non-solvent liquid having a boiling point higher than the acetic acid and continuing the distillation to remove the remaining acetic acid and the organic non-solvent liquid from the cellulose acetate.

7. The process of preparing cellulose acetate comprising acetylating cellulose by means of acetic acid anhydride in the presence of acetic acid and a catalyst, ripening the resulting cellulose acetate, adding thereto a neutralizing agent for the catalyst and an organic non-solvent liquid and subjecting the resulting mixture to distillation to remove the acetic acid and non-solvent liquid from the cellulose acetate.

8. The process of preparing cellulose esters comprising esterifying cellulose by means of an esterifying agent in the presence of an organic acid and a catalyst, ripening the cellulose ester thus formed, adding thereto a neutralizing agent for the catalyst and an organic non-solvent liquid having a boiling point higher than that of the organic acid employed and subjecting the resulting mixture to distillation to remove the organic acid from the cellulose ester.

9. The process of preparing cellulose acetate comprising acetylating cellulose by means of acetic anhydride in the presence of acetic acid and a catalyst, adding thereto a neutralizing agent for the catalyst and an organic non-solvent liquid having a boiling point higher than that of acetic acid and subjecting the resulting mixture to distillation to remove the acetic acid and the organic non-solvent liquid from the cellulose acetate.

10. The process of preparing cellulose esters comprising esterifying cellulose by means of an esterifying agent in the presence of an organic acid, adding thereto an organic non-solvent liquid, mechanically separating excess liquids from the resultant mixture, adding a further amount of the organic non-solvent liquid and subjecting the resulting mixture to distillation to remove the remaining organic acid from the cellulose ester.

11. The process of preparing cellulose acetate comprising acetylating cellulose by means of acetic acid anhydride in the presence of acetic acid and a catalyst, adding thereto a neutralizing agent for the catalyst and an organic non-solvent liquid, subjecting the resulting mixture to distillation to remove the acetic acid and the organic non-solvent liquid and separating the acetic acid and organic non-solvent liquid by fractional distillation from the cellulose acetate.

12. The process of preparing cellulose acetate comprising acetylating cellulose by means of acetic anhydride in the presence of acetic acid and a catalyst, adding thereto a neutralizing agent for the catalyst and an organic non-solvent liquid, draining the resultant mixture of excess liquids, adding a further amount of the organic non-solvent liquid, subjecting the resulting mixture to distillation to remove the remaining acetic acid and organic non-solvent liquid and subjecting the draining and distillate to fractional distillation for the recovery of concentrated acetic acid from the cellulose acetate.

HERBERT E. MARTIN.